(12) United States Patent
Parker

(10) Patent No.: US 7,501,725 B2
(45) Date of Patent: Mar. 10, 2009

(54) METHOD OF CONVERTING PISTON DRIVEN ENGINES TO OPERATE ON ELECTRICITY

(75) Inventor: Stephen Patrick Parker, Rolla, MO (US)

(73) Assignee: Steve Parker, Rolla, MO (US)

( * ) Notice: Subject to any disclaimer, the term of this patent is extended or adjusted under 35 U.S.C. 154(b) by 424 days.

(21) Appl. No.: 11/507,318

(22) Filed: Aug. 21, 2006

(65) Prior Publication Data

US 2008/0042497 A1 Feb. 21, 2008

(51) Int. Cl.
*H02K 7/06* (2006.01)
*H02K 7/065* (2006.01)
*F15B 11/00* (2006.01)

(52) U.S. Cl. .............. 310/24; 310/34; 310/35; 180/65.1

(58) Field of Classification Search ............ 310/10, 310/12, 13, 17, 23, 24, 29, 30, 34, 35; 180/65.1, 180/65.3
See application file for complete search history.

(56) References Cited

U.S. PATENT DOCUMENTS

| | | | | |
|---|---|---|---|---|
| 1,436,245 | A | * | 11/1922 | Geisler ............. 310/24 |
| 1,886,040 | A | | 11/1932 | Moodyman |
| 4,317,058 | A | | 2/1982 | Blalock |
| 4,473,763 | A | | 9/1984 | McFarland |
| 4,510,420 | A | | 4/1985 | Sasso |
| 4,523,114 | A | | 6/1985 | Smith |
| 4,631,455 | A | | 12/1986 | Taishoff |
| 4,749,893 | A | | 6/1988 | Reynolds |
| 5,036,930 | A | * | 8/1991 | Bisel et al. ......... 180/65.1 |
| 5,276,372 | A | * | 1/1994 | Hammer ............ 310/24 |
| 5,457,349 | A | * | 10/1995 | Gifford ............. 310/24 |
| 5,469,004 | A | | 11/1995 | Jachim |
| 5,547,349 | A | | 8/1996 | Kimura et al. |
| 5,592,036 | A | | 1/1997 | Pino |

(Continued)

*Primary Examiner*—Tran N Nguyen

(57) ABSTRACT

A method of converting piston driven engines to operate on electricity. The head is removed from the engine. A solenoid tube, approximately twice as long as the stroke of the engine piston, for identification purposes, called a Double Length Solenoid Tube (13) or DLST (13) is fitted with flanges approximately on each end and in the middle, and is wound with suitable wire in layers from end flanges to middle making two separate magnetic coils on the DLST (13) a bar, which can be temporarily magnetized, for identification purposes is called the power magnet, PM (16) is attached to a rod, which cannot be magnetized, for identification purposes, called the Power Rod, PR (21) is fastened to the top of the engine piston (31). When the engine piston (31) approaches Top Dead Center, TDC, the PM (16) is in the top half of the DLST (13) approximately at this position the bottom magnetic coil (85) is energized pulling the PM (16) and the PR (21) down; pushing the engine piston (31) down; turning the crankshaft (34) from 0 degree to 180 degrees. When the engine piston (31) is at Bottom Dead Center, BDC, the PM (16) is as close to the center of the crankshaft (34) as it can be. The top coil is energized, magnetically pulling the PM (16) the PR (21) and the engine piston (31) up; turning the crankshaft from 180 degrees to 360 degrees, completing the cycle. Therefore, by using a double length solenoid tube with two coils, a solenoid magnet bar 16 pushes down on the downstroke and pulls up on the upstroke to the engine piston delivering power to the crankshaft on every stroke. Included in specifications is an electrical switching system, two cooling systems and a lubrication system. This method can be applied to any piston driven engine.

1 Claim, 6 Drawing Sheets

U.S. PATENT DOCUMENTS

| | | |
|---|---|---|
| 5,637,936 A | 6/1997 | Meador |
| 5,757,093 A | 5/1998 | Susliev et al. |
| 6,049,146 A | 4/2000 | Takara |
| 6,278,204 B1 | 8/2001 | Frenette |
| 7,105,958 B1 * | 9/2006 | Elmaleh ...................... 310/24 |

* cited by examiner

METHOD OF CONVERTING PISTON DRIVEN ENGINES TO OPERATE ON ELECTRICITY

CROSS-REFERENCE TO RELATED APPLICATIONS

Not applicable

FEDERALLY SPONSORED RESEARCH

Not applicable

SEQUENCE LISTING OR PROGRAM

Not applicable

FIELD OF THE INVENTION

The invention relates to converting piston driven engines to operate on electricity.

BACKGROUND OF THE INVENTION

The growing energy crisis has caused many people to try to convert gasoline engines to run batteries. I discovered a method to convert a garden tractor engine to operate on a car battery. Then I had a patent search made. I had not been influenced by other inventions. Several patents regarding electrifying engines have been granted. My invention differs from all I saw in several ways. I found no patent using a double length solenoid tube having two separate coils to produce power on the down stroke and the up stroke. I found no patents using the flywheel or crankshaft pulley to host devices used in electrical switching systems to have the magnets pulling on every stroke. I found no patents that claimed to have a working model. My conversion method does all of the above listed, and the conversion can be made with parts easily obtainable.

SUMMARY OF THE INVENTION

A method of converting piston driven engines to operate on electricity. This method can be used on alternating current, AC, or direct current, DC, on engines with any number of pistons. The means of providing this conversion is by making a solenoid tube approximately twice the length of the stroke of the engine piston. The double length solenoid tube is wound with suitable wire; two separate magnetic coils are wound from approximately opposite ends to the middle. A bar, which can be temporarily magnetized and is approximately the length of the stroke of the engine piston, is connected at one end to a rod, which cannot be magnetized; the other end of the rod, is connected to the top of the engine piston. The length of the rod is approximately the length of the stroke of the engine piston. The double length solenoid tube is fastened over a cylinder; if a plurality of cylinders are used, each should have its own approximately double length solenoid tube. When the bar is in the top part of the tube, the bottom coil is energized pulling the bar into the bottom part of the double length solenoid tube, pushing the engine piston down, turning the crankshaft 180 degrees, when the bar and its piston connections are in the bottom part of the double length solenoid tube, the top coil is energized, pulling the bar and its piston connections up, turning the crankshaft completely the 360 degree cycle. The engine piston or pistons and the crankshaft are under working pressure from each piston, almost all the time.

Figure 1:
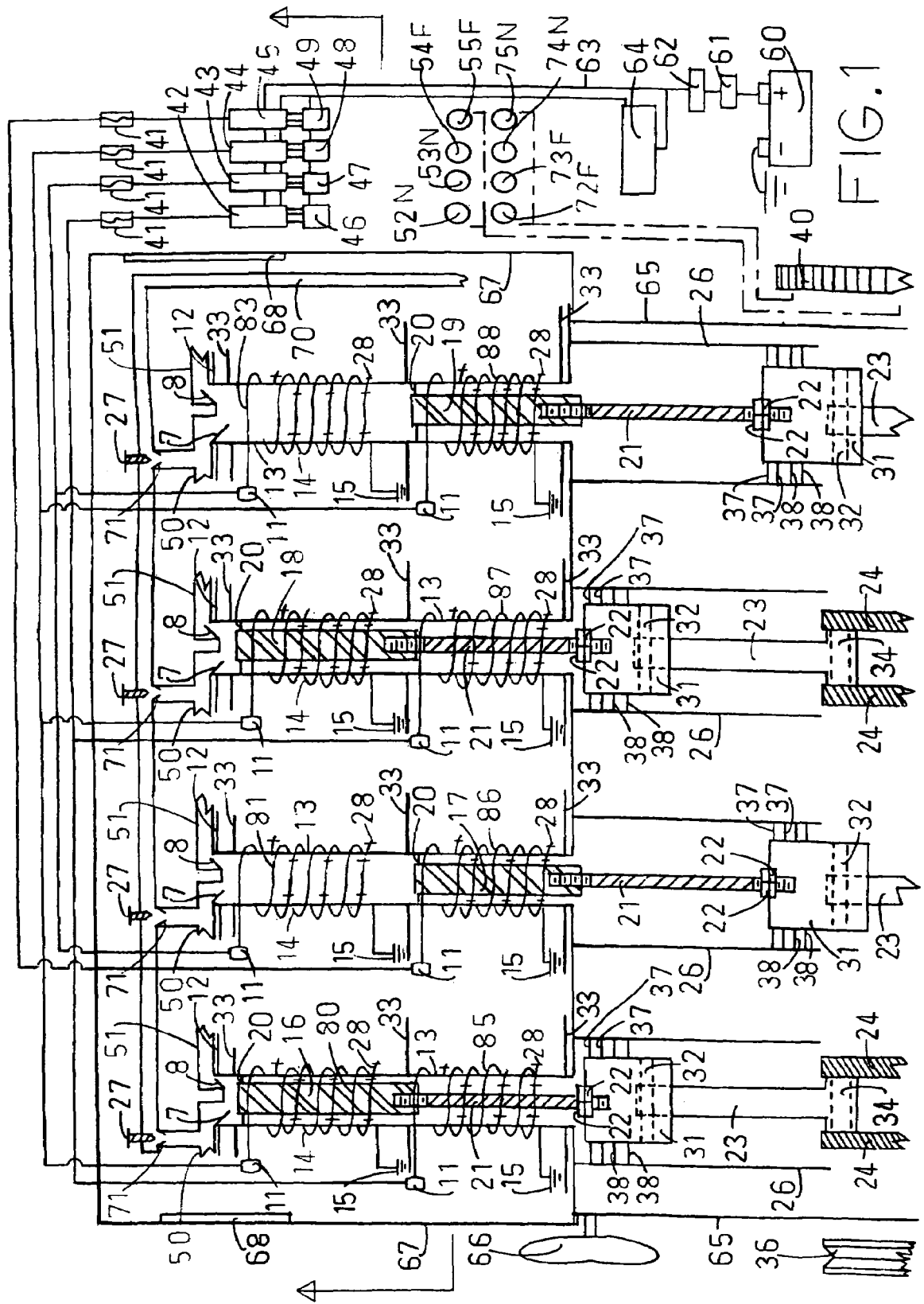
FIG. 1, the preferred embodiment, shows a half section view of the block of a four-cylinder engine with a double length solenoid tube above each cylinder, with two separate coils wound about the tubes, a small cooling tube marked with vertical lines, is wound with coils: the basic electrical system is also shown.

| DRAWINGS-Reference numerals | |
|---|---|
| 7 | one-way oil/air/intake valve |
| 8 | one-way oil/air exhaust valve |
| 9 | one-way air intake valve |
| 10 | one-way air exhaust valve |
| 11 | heat switch |
| 12 | oil-air tube flange |
| 13 | double length solenoid tube |
| 14 | suitable coil wire |
| 15 | grounded wire |
| 16 | power magnet |
| 17 | power magnet |
| 18 | power magnet |
| 19 | power magnet |
| 20 | oil-air ring |
| 21 | power rod made of non-magnetic material |
| 22 | threaded nut |
| 23 | connecting rod between engine piston and crankshaft |
| 24 | crankshaft lobe |
| 25 | all thread rod |
| 26 | engine cylinder |
| 27 | oil-air mist-adjusting screw |
| 28 | small liquid cooling tube |
| 29 | air intake cooling tube |
| 30 | air exhaust cooling tube |
| 31 | engine piston |
| 32 | wrist pin |
| 33 | solenoid flange |
| 34 | crankshaft |
| 35 | crankcase |
| 36 | crankshaft pulley |
| 37 | engine piston compression ring |
| 38 | engine piston oil ring |
| 39 | flywheel cover |
| 40 | flywheel |
| 41 | fuse |
| 42 | voltage amperage amplifier wired to adjustable pickup 46 |
| 43 | voltage amperage amplifier wired to adjustable pickup 47 |
| 44 | voltage amperage amplifier wired to adjustable pickup 48 |
| 45 | voltage amperage amplifier wired to adjustable pickup 49 |
| 46 | adjustable pickup opposite flywheel switch 52 and 72 |
| 47 | adjustable pickup opposite flywheel switch 53 and 73 |
| 48 | adjustable pickup opposite flywheel switch 54 and 74 |

-continued

| DRAWINGS-Reference numerals | |
|---|---|
| 49 | adjustable pickup opposite flywheel switch 55 and 75 |
| 50 | oil-air intake tube |
| 51 | oil-air exhaust tube |
| 52N | flywheel switch on |
| 53N | flywheel switch on |
| 54F | flywheel switch off |
| 55F | flywheel switch off |
| 60 | battery |
| 61 | ignition switch apparatus |
| 62 | pedal voltage amperage controller |
| 63 | main electrical source supply wire |
| 64 | computer |
| 65 | engine block |
| 66 | engine fan |
| 67 | air shroud |
| 68 | air filter |
| 70 | oil supply tube |
| 71 | valve seat |
| 72F | flywheel switch off |
| 73F | flywheel switch off |
| 74N | flywheel switch on |
| 75N | flywheel switch on |
| 77 | supply wire |
| 78 | starter motor hole |
| 80 | top magnetic coil |
| 81 | top magnetic coil |
| 82 | top magnetic coil |
| 83 | top magnetic coil |
| 85 | bottom magnetic coil |
| 86 | bottom magnetic coil |
| 87 | bottom magnetic coil |
| 88 | bottom magnetic coil |

DETAILED DESCRIPTION OF THE INVENTION

Turning now to FIG. 1, a detailed description concerning basic components of a conventional internal combustion engine as well as the components for modifying the internal combustion engine to facilitate conversion into an electrical driven engine will now be provided. As can be seen in FIG. 1 the internal combustion engine comprises an engine block 65, which has a desired number of cylinder bores 26, formed therein, e.g. in this FIG. 1 there are four cylinder bores. Each cylinder bore 26, has an inwardly facing surface, which is sized to have a close sliding fit with a mating outwardly facing surface of mating piston 31. Each piston 31, typically has two spring biased lower oil rings 38, and two spring biased compression rings 37, which are positioned between the outwardly facing surface of the engine pistons 31 and the inwardly facing surface of the cylinder bore 26. The oil rings 38 slide against the inwardly facing surfaces of the cylinder bores 26, as the pistons 31, move back and forth within the cylinder bores 26, during the operation of the engine and separate the oil in the engine from the top of the cylinder bores 26.

A lower portion of each piston 31 is pivotally connected to a central crankshaft 34, by a connecting rod 23, at the crankshaft lobe 24, in a conventional manner, as is well known in the art. The central crankshaft 34 supplies output driving power for the engine to drive a shaft (not shown). In a conventional manner each one of the four pistons 31 is similarly connected with the crankshaft 34 (partially shown), at a desired spacing along the crankshaft 34, by an associated connecting rod 23.

The crankshaft 34 is coupled to a flywheel 40, and the crankshaft pulley 36 in a conventional manner. The conventional internal combustion engine 65 is also provided with an internal oil pump (not shown), which provides lubricating oil, located in the bottom portion of the oil pan (not shown). The oil pump supplies oil to the moving components of the internal combustion engine to keep those components sufficiently lubricated during the operation of the engine, as is conventionally done in the art. As such teaching is well known in the art, a further detailed discussion concerning the same is not provided.

Now that the basic components of the internal combustion engine have been briefly described, a detailed description concerning modification of the engine 65 according to the teaching for the present invention, will now be provided.

To convert a piston driven engine to operate on electricity we must first find the Length of Stroke, LOS, of the engine piston. Remove the head of the engine. Measure the LOS of the engine piston 31, that is the distance the engine piston 31, travels in the engine cylinder 26, from Top Dead Center, TDC, where the top of the engine piston 31, is near the top of the engine cylinder 26, and is as far away from the centerline of the engine crankshaft 34 as it can be, until it travels down the engine cylinder 26, to Bottom Dead Center, BDC, where the top of the engine piston 31, is as close to the center line of the engine crankshaft 34 as it can be. Then the engine piston 31 is identified as being at BDC. The LOS determines the length of three of the main components of the conversion of the piston engine 31 to operate on electricity. The LOS will be the same for all pistons 31, in the same engine 65. The length of the solenoid tube is approximately the LOS multiplied by 2. A Double Length Solenoid Tube, DLST 13 has flanges 33, fastened approximately at each end and in the middle of the DLST 13, these flanges 33 are large enough to cover the engine cylinder 26 with at least one flange 33, having holes drilled in it to align and fasten it over the engine cylinder 26, to the engine block 65, head bolt holes.

The length of any of the DLST 13 is approximately the LOS multiplied by 2, each DLST 13 has 2 separate coils of suitable wire 14, wound from opposite end flanges 33, to the middle flange 33 in layers. The top magnetic coils 80, 81, 82, 83 are farthest away from the top of the engine block 65 as they can be. The bottom magnetic coils 85, 86, 87, 88 are as close to the top of the engine block 65 as they can be.

Figure 3:
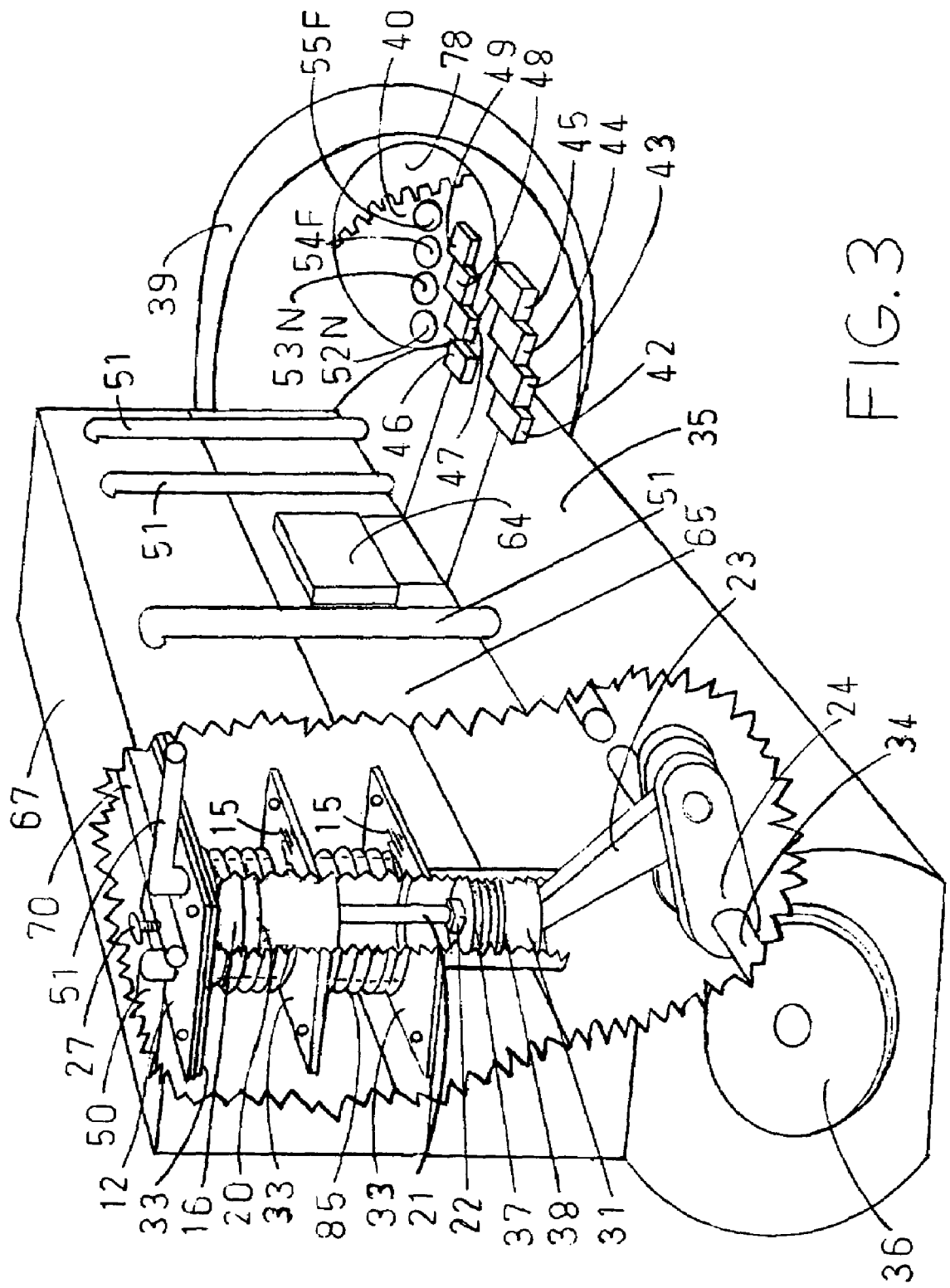
FIG. 3 a perspective view with cutaways, showing one double-length solenoid with its parts, one engine cylinder with its parts, and the connection to the crankshaft.
Figure 4:
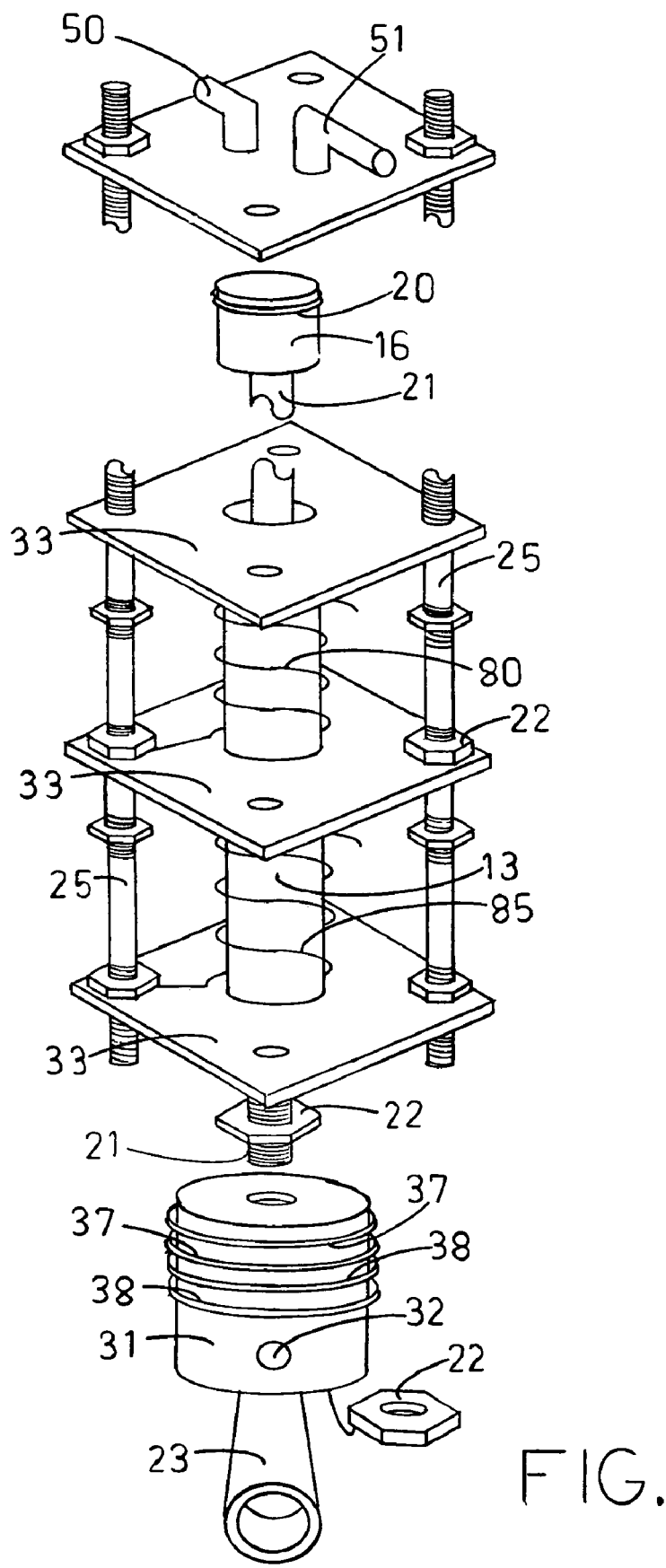
FIG. 4 an exploded view showing the double length solenoid tube, the coils the power magnet, the power rod, the engine piston and connecting rod; also shown (not claimed) is a system I used to align the flanges to the tube prior to soldering.

The main source of electricity can be alternating current, AC, or direct current, DC, in this example, a battery 60, which provides electrical flow through the ignition switch apparatus 61, through the pedal voltage-amperage controller 62, through the main electrical source supply wire 63, through the voltage amplifiers 42, 43, 44, 45, here the voltage can be increased as it is distributed to the supply wires. The voltage amplifiers, electronic devices, which can also work in conjunction with a computer 64 or micro processor 64 so that the speed of the engine, Revolutions Per Minute, RPM, and the amperage draw (electrical flow), and other factors, can be used to determine the advancement or retardation of the timing position of the adjustable pickups 46, 47, 48, 49. The adjustable pickups can be positioned through the empty starter motor hole 78, providing access to the flywheel 40, since there is no need for the starter motor in this conversion. A vacuum can be taken from the oil-air intake tube 50 to operate a mechanical advance similar to that used on the distributor of some conventional engines. FIG. 3 depicts a perspective view which portrays the approximate placement of the adjustable pickups 46, 47, 48, 49 through the starter motor hole 78. FIG. 4 depicts an exploded view of the main parts of a conversion unit. The threaded nuts 22 and rod 21, use standard threads. There are many fastening systems that can be used. The threaded system here by no means excludes other systems. The long all thread rods 25 and nuts 22, are a means, not claimed, I used to insure accuracy of placement while soldering or welding.

Figure 5:
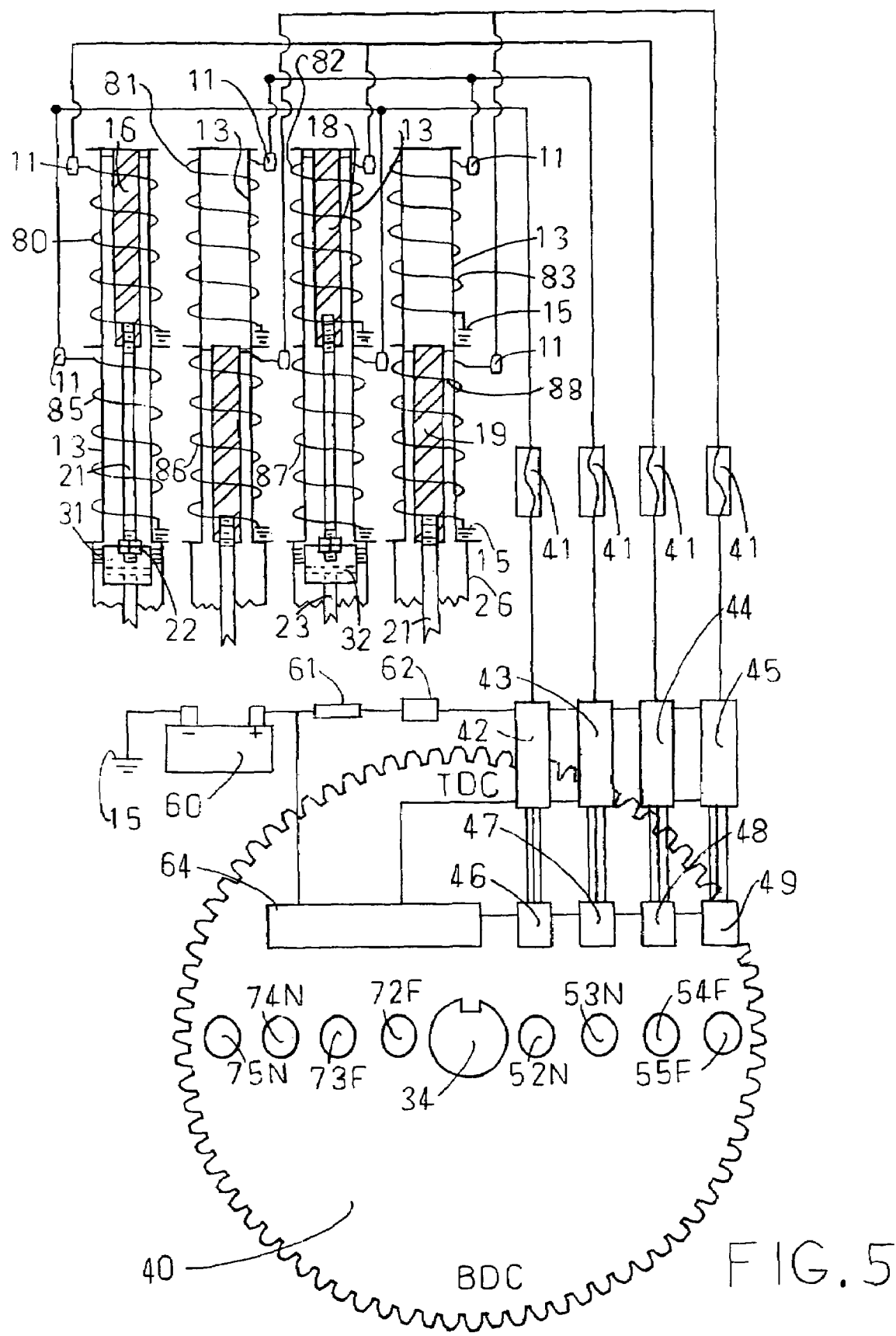
FIG. 5 an electrical system showing a flywheel with switching devices attached, depicting by dots what circuits are energized during the first 180 degrees turning of the flywheel.
Figure 6:
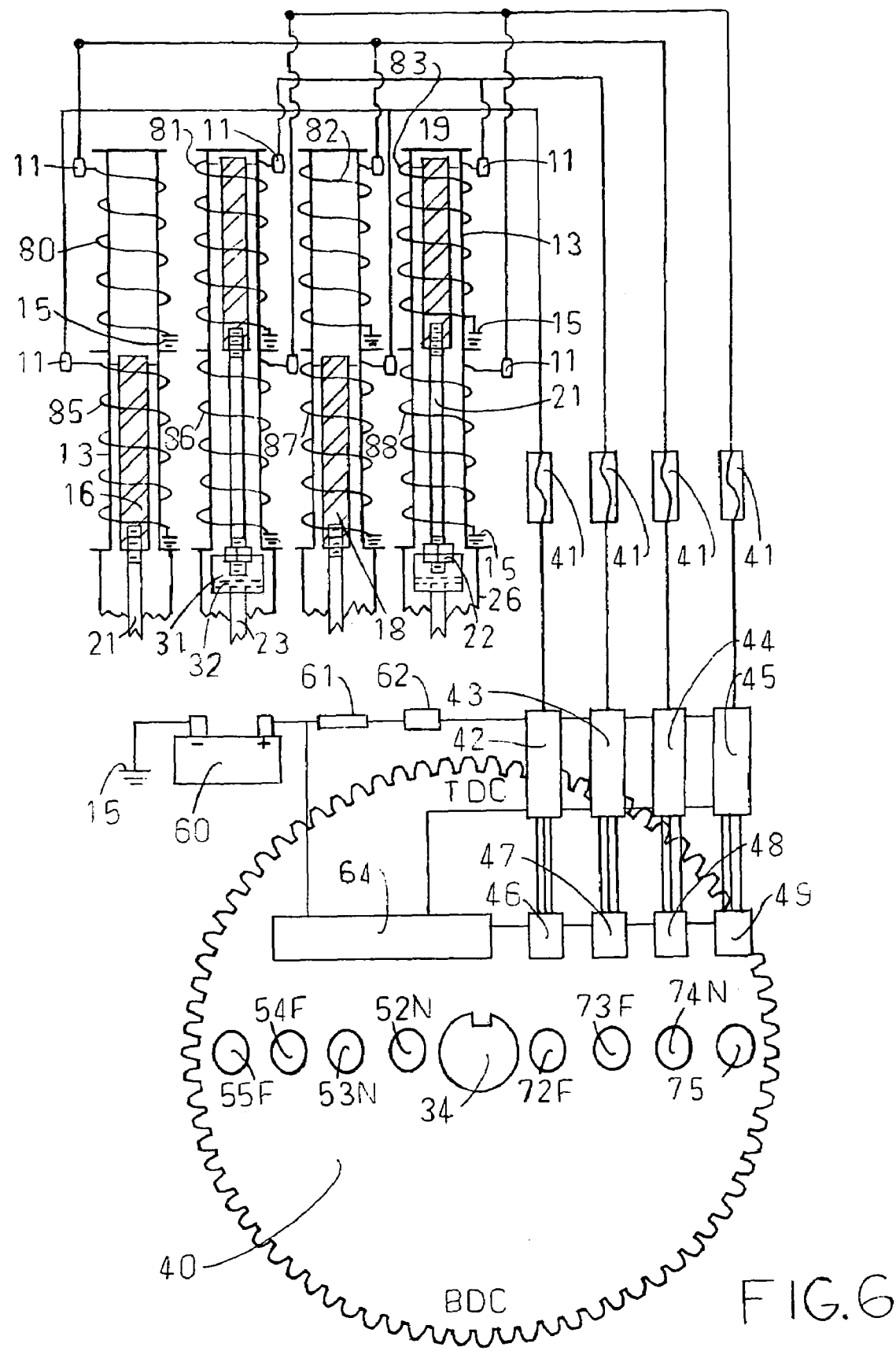
FIG. 6 an electrical system showing a flywheel and depicting by dots what circuits are energized during the $2^{nd}$, 180 degree turning to the 360 degree turning of the flywheel.

FIG. 5 and FIG. 6 depict the switching parts of the electrical system. FIG. 5 depicts a flywheel 40, with teeth, with flywheel switches 75N, 74N, 73N, 73F, and 72F fastened on one side and flywheel switches 52N, 53N, 54F, and 55F fastened on the side where they are depicted in FIG. 5, directly opposite the adjustable Pickups 46, 47, 48, 49. When the flywheel turns past the adjustable pickups, the flywheel switches send an appropriate electrical impulse to the adjustable pickups 46, 47, 48, 49 which in turn send an appropriate electrical impulse to the voltage amplifiers 42, 43, 44, 45 which control the voltage and amperage from the main electrical source.

A bar, which can be temporarily magnetized, is approximately the LOS and fits loosely into the DSLT 13, the top end of each bar is fitted to accommodate an oil air ring 20 or rings 20, the other end of the bar, the bottom end is fitted to accommodate a rod which is connected at the other end to the top of the engine piston 31, the bar, which for identification purposes is named a Power Magnet, PM, or PM 16, PM 17, PM 18, PM 19. Each PM is connected to an engine piston 31, by a rod, which cannot be magnetized, and for identification purposes is named a Power Rod, PR 21, is approximately the LOS of the engine piston 31, and is as strong as the engine piston connecting rod 23.

Figure 2:
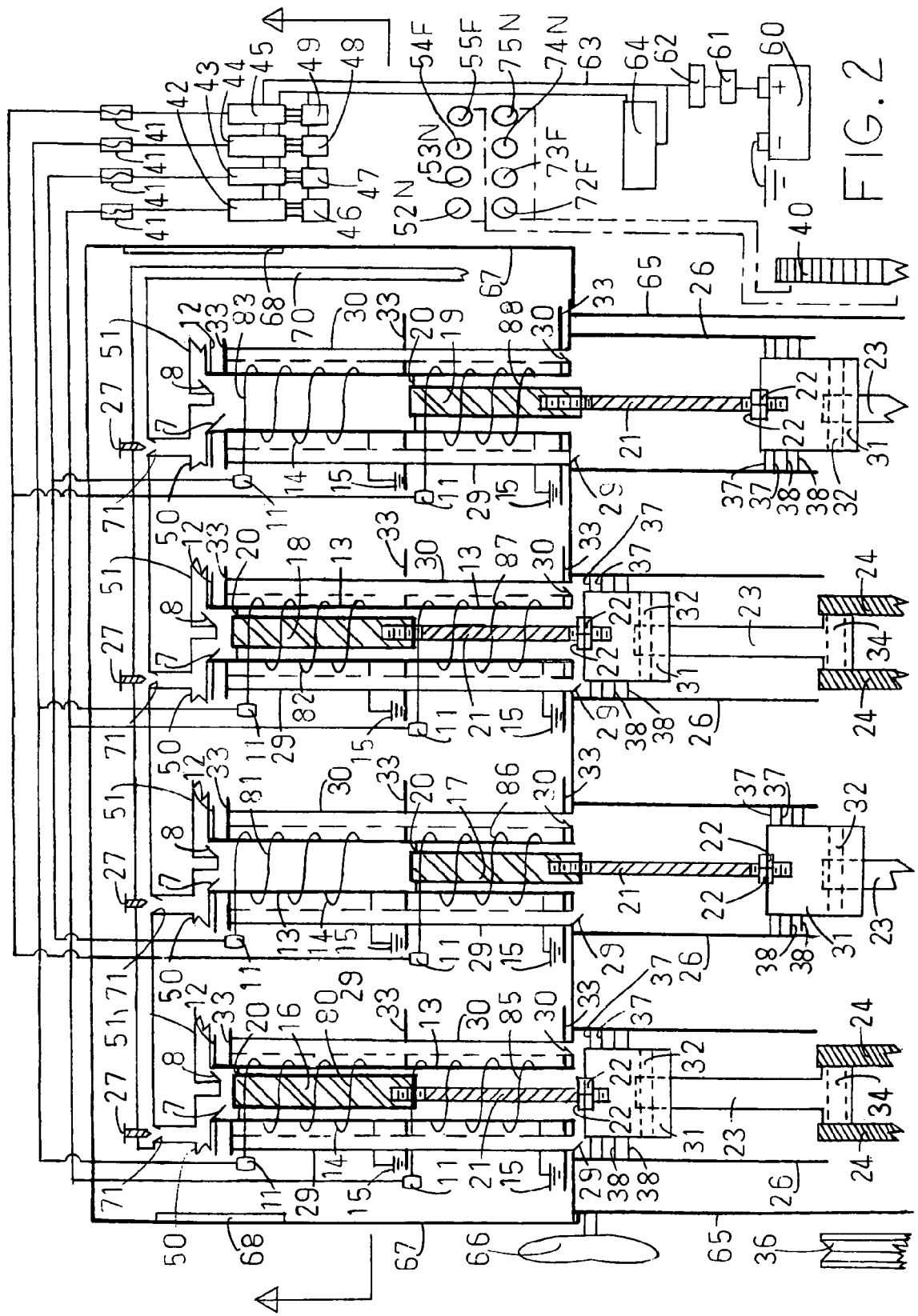
FIG. 2 shows a half section view of the block of a four-cylinder engine with a double length solenoid tube above each cylinder with two separately wound coils, wound around the tube, air cooling tubes are placed around the coils to cool them, the basic electrical system is also shown.

FIG. 1, FIG. 2, and FIG. 3 depict a lubrication system for the upper half of the DLST 13 and the ring 20 or rings 20 on the PMS'. The system comprises a one way oil-air exhaust valve 8, an oil-air exhaust tube 51, which is connected to the crankcase 35, a one-way oil air intake valve 7, an oil-air intake tube 50 placed near an oil supply tube 70, which is connected to conventional engine oil system, an oil-air mist adjusting screw 27 and its' seat 71, as a means to let drops of oil into the oil-air intake tube 50, to mix with air to create an oil-air mist which can be pulled into the top part of the DLST 13. Each PM has an oil-air ring 20 or rings 20, which seal the top of the PM's to provide a means to create a compression or vacuum in the top half of the DLST 13, when the PM's slide back and forth in the DLST 13, as a means to pull in an oil-air mist mixture for lubrication to the top of the DLST 13.

Cooling the magnetic coils 80, 81, 82, 83, 85, 86, 87, 88 in FIG. 1 small flexible tubes 28, in coils marked with vertical slash marks, are wound with suitable wire 14, or in layers with each of the magnetic coils 80, 81, 82, 83, 85, 86, 87, 88 these tubes are connected to the radiator system of the engine block 65. Any engine coolant can be pumped thru the small flexible tubes 28, to cool the magnetic coils 80, 81, 82, 83, 85, 86, 87, 88, or a refrigerant can be pumped thru the tubing to provide cooling for the magnetic coils.

FIG. 2 depicts tubes, with holes, in the sides, are placed around the outside of the magnetic coils, the tubes are the same length as the DLST's 13 and connected to the interior of the engine cylinders 26 by intake one-way intake valves 9, and one way exhaust valves 10. When the engine piston 31 moves down the engine cylinder 26, air is pulled into the cylinder 26, the one-way intake valve 9 is open, and the one-way exhaust valve 10 is closed. When the engine piston 31 moves up in the cylinder 26, the one-way intake valve 9, is closed and the one-way exhaust valve 10 is open, the air in the cylinder 26 is pushed through the exhaust valve 10, through the holes of the exhaust cooling tubes 30, onto the magnetic coils, to cool them.

DESCRIPTION AND FUNCTION

The main part of this method of converting a piston driven engine is in making the solenoid tube approximately twice the length of the stroke of the engine piston, making a Double length Solenoid Tube, DLST. Each DLST is wound with suitable wire to make two separate magnetic coils, with a main electrical source, in this example, a battery 60 which provides electrical flow through the ignition switch apparatus 61, through the pedal voltage-amperage controller 62, through the main electrical source supply wire 63, through the voltage amplifiers 42, 43, 44, 45, here the voltage can be conjunction with a computer 64 or micro processor 64 so that the speed of the engine, Revolutions Per Minute, RPM, and the amperage draw (electrical flow), and other factors, can be used to determine the advancement or retardation of the timing position of the adjustable pickups 46, 47, 48, 49.

FIG. 1 and FIG. 2 depict a four cylinder piston driven engine with conversion units over each cylinder, the Double Length Solenoid Tubes, DLST 13, are shown with separate representative coils of wire wound on each DLST 13, a Power Magnet, PM 16, PM 17, PM 18, PM 19, is located inside each DLST 13, and a Power Rod, PR 21, connects each PM to an engine piston 31, there are 2 separate coils wound around each DLST 13, since they are energized at different times they are numbered separately for identification and function, they are 80 top magnetic coil, 81 top magnetic coil, 82 top magnetic coil, 83 top magnetic coil, 85 bottom magnetic coil, 86 bottom magnetic coil, 87 bottom magnetic coil, 88 bottom magnetic coil. The top magnetic coils 80, 81, 82, 83, pull their respective PM's up. The bottom magnetic coils, 85, 86, 87, 88, when energized, pull their respective PM's down. Energizing of the coils in this example, but not limited to, occurs when the flywheel with its 2 sets, of 4 each flywheel switches 72F, 73F, 74N, 75N and 52N, 53N, 54F, 55F, fastened to it turns past the adjustable pickups 46, 47, 48, 49, sending an electrical impulses through them to their corresponding voltage amplifiers 42, 43, 44, 45. FIG. 5 depicts flywheel 40, with teeth, with flywheel switches 52N, 53N, 54F, and 55F, opposite adjustable pickups 46, 47, 48, 49. The Flywheel Switches, FS, with the N identifier, always turn the designated coils on, the flywheel switches with F identifier, always turn their designated coils off. In FIG. 5 the Flywheel Switch, FS 52 N, sends an on electrical impulse to the adjustable pickup 46, which in turn sends an electrical impulse to voltage amplifier 42, an electronic device which can increase the voltage and decrease the amperage to energize coils 87 and 85, pulling down on PM 16 and 18, since this pair is in the same mode. One FS 52N, one adjustable pickup 46, and one voltage amplifier 42, can operate two coils. In FIG. 5, the FS 53N sends an electrical impulse to the adjustable pickup 47, which in turn sends an on electrical impulse to the voltage amplifier 43, an electronic device, which can increase the source voltage to a higher electrical voltage, and lower the amperage, through the supply wire 77, through the fuse 41, to coil 83, and coil 81, pulling the PM 17 and PM 19 up. At the same time FS 55F and FS 54F have turned off the electrical supply to adjustable pickup 48 and 49, turning off the electricity to voltage amplifier 44, turning off coils 80 and 82, turning off coils 86 and 88, and all four pistons are turning the crankshaft the first 180 degrees. In FIG. 6, after the flywheel 40, makes a half turn, the flywheel switches 72F, 73F, 74N and 75N are opposite the adjustable pickups 46, 47, 48 and 49. The flywheel switch 72F turns off the electrical impulse to adjustable pickup 46, turning off the voltage amplifier 42, turning off coils 85 and 87, then flywheel switch 73F, turns off adjustable amplifier 47, turning off coils 81 and 83, the FS 74N turns on the electrical impulse to adjustable pickup 48, turning on the voltage to voltage amplifier 44, an electronic device, which can increase the voltage and decrease the amperage, and sends the increased voltage to its' supply wire 77, through the fuse 41, and energizes coil 82 and coil 80, pulling the pair of PM's 16 and 18 up. Since the coils 82 and 86 are a pair, the one FS 74 can turn on both coils. The FS 75N sends an electrical impulse to adjustable pickup 49, turning on voltage amplifier 45, an electrical device, which can increase the voltage and decrease the amperage from the voltage source 60, sending the increased voltage to a voltage supply wire 77, through the fuse 41 and energizing coils 88 and 86 pulling the pair of PM's 17 and 19 down. Since the coils 88 and 86 are a pair in the same mode, the one FS 75N can energize both coils. All four-engine pistons 31 are turning the crankshaft 34, from 180 degrees to 360 degrees, completing the cycle.

FIG. 1. FIG. 2, FIG. 3, and FIG. 4 depict an oil-air tube flange 12, which is connected to the top of the DLST 13. The oil-air tube flange 12, is the base for an oil-air exhaust tube 51, and an oil-air intake tube 50. FIG. 1, and FIG. 2, depicts a one-way oil-air intake valve 7, and a one-way oil-air exhaust valve 8. When the PM's move down the DLST 13 they pull clean air by virtue of the encasement of the air shroud 67, the air filters 68, and the blowing of the flywheel 66, through the oil-air intake tube 50, past the regulated valve seat 71, in the oil supply tube 70, the seat is regulated by the oil-air adjusting screw 27. The slight vacuum at this seat causes oil droplets to enter the oil-air intake tube 50, making an oil-air mist, which passes through the one-way oil-air intake valve 7 into the DLST 13, coating the top part of the DLST 13, and the ring 20 or rings 20 with oil and cooling air. When the PM's reach BDC and start back up, the one-way oil-air intake valves 7, close and the one-way oil-air exhaust valves 8 open, the sealed PM's push the remaining oil-air mist out the oil-air exhaust tubes 51, and back into the crankcase 35. Lubricating the ring 20 or rings 20 and the top of the interior of the DLST 13.

Cooling the magnetic coils 80, 81, 82, 83, 85, 86, 87, 88 in FIG. 1 small flexible tubes 28, in coils marked with vertical slash marks, are wound with suitable wire 14, or in layers with each of the magnetic coils 80, 81, 82, 83, 85, 86, 87, 88 these tubes are connected to the radiator system of the engine block 65. Any engine coolant can be pumped thru the small flexible tubes 28, to cool the magnetic coils 80, 81, 82, 83, 85, 86, 87, 88, or a refrigerant can be pumped thru the tubing to provide cooling for the magnetic coils.

FIG. 2 depicts tubes, with holes, in the sides, are placed around the outside of the magnetic coils, the tubes are the same length as the DLST's 13 and connected to the interior of the engine cylinders 26 by intake one-way intake valves 9, and one way exhaust valves 10. When the engine piston 31 moves down the engine cylinder 26, air is pulled into the cylinder 26, the one-way intake valve 9 is open, and the one-way exhaust valve 10 is closed. When the engine piston 31 moves up in the cylinder 26, the one-way intake valve 9, is closed and the one-way exhaust valve 10 is open, the air in the cylinder 26 is pushed through the exhaust valve 10, through the holes of the exhaust cooling tubes 30, onto the magnetic coils, to cool them. Providing a means to cool the coils on an air-cooled engine.

I claim:

1. A method of converting piston driven engines to operate on electricity, comprising:

(a) providing a double-length solenoid tube having approximately twice as long as a length of a stroke of an engine piston, and being fitted with flanges covering the engine cylinder, the double-length solenoid tube is fastened with flanges wherein a middle of the double-length solenoid tube at least one flange has holes drilled to align and fasten over an engine cylinder to an engine block;

(b) providing wire wound in layers around the double length solenoid tube to form two separate magnetic top and bottom coils, wherein the top coil is farthest away from a top of the engine block, the bottom coil is close to the top of the engine block, (c) providing a magnetizable bar having approximately same length as the length of the stroke of the engine piston, and predetermined size and weight so that said magnetizable bar able to turn the crankshaft, as said magnetizable bar slides back and forth, from said top coil to said bottom coil in the double length solenoid tube, wherein said magnetizable bar, has at least one ring, around outside end, sliding against an inside surface of the double length solenoid tube;

(d) providing a nonmagnetic rod having, approximately same length as length of stroke of the engine piston, wherein one end of the nonmagnetic rod is fastened to an end of the magnetizable bar and the other end of the nonmagnetic rod is fastened to the top of the engine piston (e) providing a set of two flywheel switches for each coil or plurality of coils, said flywheel switches are fastened to the flywheel or crankshaft pulley, approximately 180 degrees apart across a diameter of the flywheel or crankshaft pulley, (f) placing adjustable pickups near the flywheel for providing a means to energize voltage amplifiers so that said voltage amplifiers energize the magnetic top and bottom coils, wherein the flywheel switches determine which coils are turned on to energize and pull the magnetizable bar, forcing the engine piston down or up, turning one of a crankshaft, the flywheel and crankshaft pulley, for providing a means to turn electrical impulse from the flywheel switches, as the flywheel or crankshaft pulley turn and increase or decrease in speed, wherein position of said adjustable pickups can be changed by one of a mechanical means, using a computer and microprocessor to monitor a speed of the engine and an electrical flow and other factors, and determine either advance or retard position of the adjustable pickups, (g) providing a means for taking kinetic energy, caused by the weight of the magnetizable bar and the nonmagnetic rod in motion at the end of each stroke by de-energizing, turning off electricity to one working coil of said top and bottom coils that magnetizing the magnetizable bar, before the bar reaches top dead center, that point in rotational cycle, where the magnetizable bar being far away from the centerline and being energizing, turning on electricity to the bottom coil, before the magnetizable bar, sliding in the double length solenoid tube, reaches top dead center, the kinetic energy can be minimized from the magnetizable bar, the nonmagnetic rod, the piston and connecting rod thereof while have full power approximate length of a down stroke;

likewise, when the magnetizable bar approaches bottom dead center, the working coil is de-energized and the top coil is energized before bottom dead center, the kinetic energy can be minimized from the magnetizable bar, the nonmagnetic rod, the piston connecting rod thereof while have full power approximate length of a up stroke;

(h) providing a means for cooling, by winding small flexible cooling tubes with said wire or by winding in between the layers of said wire said small flexible cooling tube can be fastened to engine cooling system providing a means to cool the top and bottom coils, or a refrigerant can be pumped through the said flexible cooling tube providing an alternate means to cool the top and bottom coils (i) providing air cooling for air-cooled engines, the cooling tubes having same as the length of the double length-solenoid tube are placed around the outside of the top and bottom coils, through the solenoid flanges, said cooling tubes have one-way valves fixed into a bottom thereof, approximately half of the said cooling tubes have one-way air intake valves and half of the said cooling tubes have one-way exhaust valves have holes along one side of said cooling tubes, said holes face the said top and bottom coils so that cooling air can be blown onto the said top and bottom coils; wherein the said cooling tubes with said one-way intake valves can have holes along one side or with the top thereof open to facilitate passage of air into said cooling intake tubes;

when the said engine piston goes down, air is pulled into said cooling tubes, through the said one-way intake valves into said engine cylinder, when the said engine piston goes up, said one-way intake valves close, air is pushed up through the said one-way exhaust valves into said exhaust cooling tubes through the said holes onto the said top and bottom coils providing cooling means to cool the top and bottom coils of, especially where an air cooled engine is converted, (j) providing a means for lubrication and cooling inside of the top of the double length solenoid tube, said top is farthest away from the centerline of the crankshaft, whereby said magnetizable bar has said at least one ring around the top end being farthest from the centerline of the crankshaft, said at least one ring helps center said bar in said double length solenoid tube, and seal said inner top part of said double length solenoid tube, wherein the double length solenoid tube has an oil-air flange put on the top end thereof, said oil-air flange has two or more smaller tubes fastened to said flange, an exhaust tube, one-way exhaust valve, fixed inside said smaller tubes and routed to vent into the crankcase, at least one intake tube is fastened to oil-air flange, said at least one intake tube has a one-way intake valve is fixed inside thereto, said at least one intake tube is vented to ambient air and placed adjacent to an oil supply tube with a device therebetween to cause the oil to mix with the air causing an oil-air mist, when said magnetizable bar, with said at least one ring is in the top part of the double length solenoid tube, said bottom coil is energized pulling down the magnetizable bar, with said at least one ring said magnetizable bar pulls ambient air into the oil-air intake tube, past said device, pulling droplets of oil from an oil supply source, the oil and air form an oil-air mist, being pulled into upper part of the double length solenoid tube lubricating and cooling the top part of said double length solenoid tube, when said magnetizable bar travels to bottom dead center, in the double length solenoid tube and starts back up in said double length solenoid tube, said magnetizable bar said at least one ring, push the oil air mist out the one-way exhaust valve, through the said exhaust pipes, into the crankcase, completing the cycle, (k) placing the magnetizable bar in the top of the double length solenoid tube, and energizing the bottom coil that pulls the magnetizable bar to the bottom part of the double length solenoid tube, pushing the engine piston down, turning the crankshaft 180 degrees, when the magnetizable bar and said engine piston are all the way down, the top coil is energized, pulling the bar and engine piston up, turning the crankshaft from 180 degrees to 360 degrees completing the cycle.

* * * * *